United States Patent [19]

Nishigaki et al.

[11] Patent Number: 4,749,669

[45] Date of Patent: Jun. 7, 1988

[54] DIELECTRIC CERAMIC COMPOSITION

[75] Inventors: Susamu Nishigaki; Shinsuke Yano; Hiroshi Kato, all of Nagoya; Tohru Fuwa, Komaki, all of Japan

[73] Assignee: Narumi China Corporation, Nagoya, Japan

[21] Appl. No.: 860,617

[22] Filed: May 7, 1986

[30] Foreign Application Priority Data

Oct. 25, 1985 [JP] Japan .................. 60-237457

[51] Int. Cl.$^4$ ............................................ C04B 35/46
[52] U.S. Cl. ................................................ 501/139
[58] Field of Search ................................. 501/137, 139

[56] References Cited

U.S. PATENT DOCUMENTS 3,195,030  7/1965  Herczog et al. ............... 501/137
4,621,066  11/1966  Nishigaki et al. ............. 501/128

FOREIGN PATENT DOCUMENTS 2941304    4/1980  Fed. Rep. of Germany ...... 501/137
50-132493  10/1975  Japan ............................ 501/137
55-100606   7/1980  Japan ............................ 501/137
60-42802    3/1985  Japan ............................ 501/137
907719     10/1962  United Kingdom .............. 501/139

OTHER PUBLICATIONS

Nomura et al., Japanese Journal of Applied Physics, vol. 22, No. 7, Jul. 1983, pp. 1125–1128.

Primary Examiner—Mark L. Bell
Attorney, Agent, or Firm—Flynn, Thiel, Boutell & Tanis

[57] ABSTRACT

A dielectric ceramic composition comprising a ternary system composition represented by the formula, $aBaO \cdot bTiO_2 \cdot cWO_3$ (wherein a, b and c are percent molar fractions totaling 100, i.e., $a+b+c=100$; $17 \leq a \leq 21.5$; $75 \leq b \leq 83$ and $0.1 \leq c \leq 5$) and characterized by an advantageous properties, particularly, high dielectric constant, large Q and small $\tau f$. In the compositions, $TiO_2$ may be partially replaced by $ZrO_2$ and, optionally, MnO may be also included up to 3 mole percent based on the total molar amount of the foregoing ingredients. The dielectric ceramic compositions are especially, but not exclusively, useful in microwave applications because of the foregoing advantages.

4 Claims, 1 Drawing Sheet

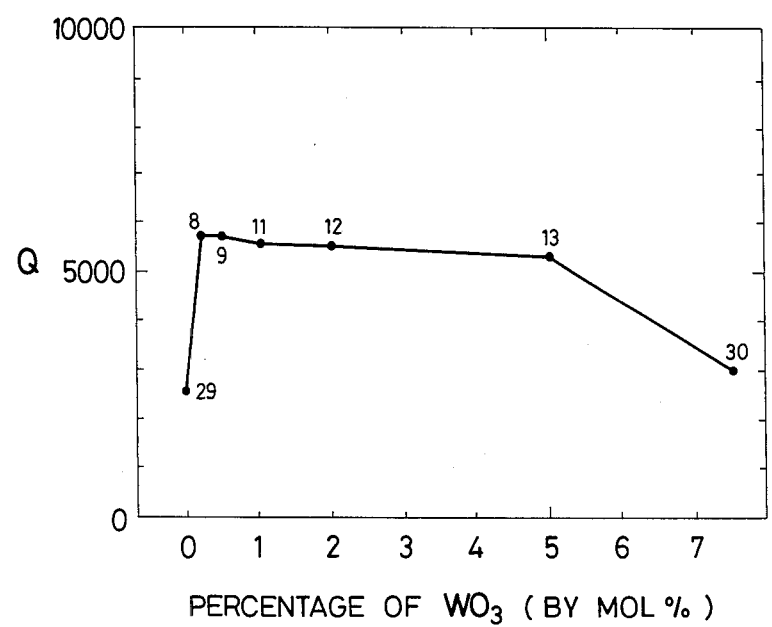

DIELECTRIC CERAMIC COMPOSITION

BACKGROUND OF THE INVENTION

The present invention relates to a dielectric ceramic composition adapted for use in microwave applications which comprises three main components of BaO, $TiO_2$ and $WO_3$. More particularly, this invention relates to a dielectric ceramic composition especially, but not exclusively, useful for microwave dielectric resonators.

Recently, there have been used dielectric materials having a high dielectric constant, a low dielectric loss and a small temperature coefficient of resonance frequency in resonators. Especially, such materials have been now brought into practical use in applications, such as receivers for a satellite broadcasting, communication devices or equipment, such as automobile telephone, or broadcasting system.

$BaO \cdot TiO_2$ system dielectric materials have heretofore been known in such applications. For example, dielectric materials comprising $Ba_2Ti_9O_{20}$ are discussed in detail in U.S. Pat. No. 3,938,064 of H. M. O'Bryan et al, entitled "Devices Using Low Loss Dielectric Material" issued Feb. 10, 1976 (Japanese Patent Publication No. 58-20 905). Further, composite perovskite dielectric materials, typically $Ba(Zn_{\frac{1}{3}}Ta_{\frac{2}{3}})O_3$, has been described in Japanese Patent Application Laid-Open No. 53-35 454. However, these known materials have the following disadvantages or problems.

The above $Ba_2Ti_9O_{20}$ dielectric ceramics are required to be treated with an acidic solution after calcination or to be treated with an oxygen atmosphere over a long period of time after firing, in order to improve their dielectric properties. It has been reported in "$Ba_2Ti_9O_{20}$ as a Microwave Dielectric Resonator" and "A new $BaO \cdot TiO_2$ Compound with Temperature-Stable High Permittivity", both presented by H. M. O'Bryan et al at American Ceramic Society 76th Annual Meeting that the dielectric ceramics thus obtained have a Q value of 4200 at 10 GHz, where Q is the reciprocal of dielectric loss $\tan\delta$, i.e., $Q=1/\tan\delta$. Also, O'Bryan et al further describe in the aforementioned U.S. Pat. No. 3,938,064 that acid leaching of calcined matrials exhibits an advantageous effect of reducing the dielectric loss of the final ceramic products. For example, there are shown improved Q values of 9,400 for $HNO_3$ leaching, 9,200 for HCl leaching and 9,600 for $H_2SO_4$ leaching in contrast to the Q of 4,900 for unleached material. Reoxidation treatment at a temperature of 900° to 1400° C. for a period of 10 to 100 hours is required in certain materials. However, the resulting Q value is insufficient for practical use in resonators and a further increased Q value has been needed.

On the other hand, in the preparation of the perovskite type ceramic material, large amounts of expensive materials, such as $Nb_2O_5$ or $Ta_2O_5$ are necessitated and will result in an increased cost.

Accordingly, an object of the present invention is to improve the foregoing disadvantages and thereby to provide dielectric ceramics having an increased Q value and a small temperature coefficient of resonance frequency which make them ideal for use in microwave devices. Hereinafter, "temperature coefficient of resonance frequency" is referred to as "$\tau f$".

SUMMARY OF THE INVENTION

In view of the foregoing object of the present invention, the present invention provides dielectric ceramic compositions mainly composed of a $BaO \cdot TiO_2 \cdot WO_3$ ternary system and, if necessary, additives of $ZrO_2$ and MnO may be contained in the compositions.

A first aspect of the present invention resides in a dielectric ceramic composition suited for microwave applications which comprises a ternary system composition represented by the formula,

$$aBaO \cdot bTiO_2 \cdot cWO_3$$

(wherein a, b and c are percent molar fractions totaling 100, i.e., $a+b+c=100$; $17 \leq a \leq 21.5$; $75 \leq b \leq 83$; and $0.1 \leq c \leq 5$).

In another aspect of the present invention, there is provided a further dielectric ceramic composition comprising a ternary system composition modified with $ZrO_2$ and represented by the formula,

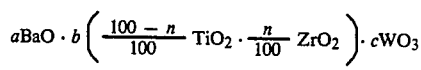

$$aBaO \cdot b\left(\frac{100-n}{100} TiO_2 \cdot \frac{n}{100} ZrO_2\right) \cdot cWO_3$$

(wherein a, b and c are mole percentages totaling 100, i.e., $a+b+c=100$; $17 \leq a \leq 21.5$; $75 \leq b \leq 83$; $0.1 \leq c \leq 5$; and $0 \leq n < 10$) and up to 3 mole percent MnO, based on the total molar amount of the a, b and c. Throughout the specification, the composition represented by the latter formula,

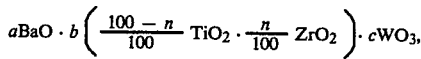

$$aBaO \cdot b\left(\frac{100-n}{100} TiO_2 \cdot \frac{n}{100} ZrO_2\right) \cdot cWO_3,$$

is referred to as ternary system composition, because it comprises basically the same main three components (i.e., BaO, $TiO_2$ and $WO_3$) as the composition of $aBaO \cdot bTiO_2 \cdot cWO_3$, although a portion of $TiO_2$ is replaced by a small amount of $ZrO_2$.

Heretofore, BaO and $TiO_2$ components have been both used in large amounts in materials for low-frequency capacitors and are inexpensive. According to the present invention, there can be produced dielectric ceramics having a high Q value by adding $WO_3$ to these components, by a simple process without requiring any extra treatment such as acid treatment or reheating treatment in an oxygen atmosphere, at a low production cost.

BRIEF DESCRIPTION OF THE DRAWING

In the drawing, the single figure is a graph showing the relationship between the proportions of $WO_3$ by mole percent and Q values.

DETAILED DESCRIPTION OF THE PREFERRED EMBODIMENTS

In the dielectric ceramic composition of the present invention, the reason why the proportions of BaO and $TiO_2$ are limited to 17 to 21.5 mole percent and 75 to 83 mole percent, respectively, is that when the percent molar fractions of these components fall outside the above specified ranges, $\tau f$ value is too large or Q value is too small.

When the ratio of $WO_3$ is less than 0.1 mole percent, Q values become small, while $WO_3$ in a molar ratio beyond 5 mole percent results in an unacceptably increased $\tau f$ value and reduced Q value.

In a relatively small content range of $TiO_2$ (i.e., $75 \leq b \leq 81.8$) within the present invention, the $WO_3$ component exhibits a $\tau f$ reducing effect. This effect can be obtained when $WO_3$ is present in a small percentage and a large proportion of $WO_3$ results in a large $\tau f$. Consequently, the proportion of $WO_3$ should be practically limited to a maximum of 5 mole percent.

Substitution of $ZrO_2$ for $TiO_2$ leads to a reduction in $\tau f$ over the entire range of the specified composition range and thus makes it easy to obtain the desired levels of $\tau f$. The reason why the amount of this replacement by $ZrO_2$ is limited below 10 mole percent is that when $ZrO_2$ is contained in amounts of 10 mole percent or more, Q becomes too small.

MnO promotes the densification of materials during the process of firing and thereby improves the Q of the final products. Further, $\tau f$ is slightly variable with the amount of MnO. Since an excess content of MnO beyond 3 mole percent reduces Q values to an unfavorable level, MnO should be limited to the content range of 3 mole percent or less.

The dielectric ceramic composition of the present invention can be obtained by a usually practiced process in the art without requiring any extra special processing step. More specifically, as source materials, compounds, such as $MnO_2$ or $Mn_2O_3$ having valencies different from the valencies in the resulting fired ceramic products may be used and, besides oxides, carbonates, such as $BaCO_3$ or $MnCO_3$, may be also used. In other words, any compound may be generally used as long as it can eventually give fired oxide products.

In the preparation of the dielectric ceramic composition, source materials are weighed depending on the desired composition and are wet blended thoroughly with water in a polyethylene pot containing alumina balls. The resulting mixture is dried and is calcined in an alumina crucible at temperatures of 1000° to 1200° C. for a period of 1 to 6 hours. The calcination operation is conducted in an oxidizing atmosphere, such as air or oxygen. After this calcination, the calcined mixture is wet milled with pure water in a polyethylene pot containing alumina balls, dried and then shaped by a compression molding. The shaped material is fired on a setter made of zirconia or platinum at a temperature of 1350° to 1420° C. for a period of 2 to 6 hours in an oxygen atmosphere.

Now, the present invention will be described in detail with reference to the following examples hereinafter.

Examples:

Various dielectric ceramic compositions were prepared in accordance with the manner previously described, using $BaCO_3$, $TiO_2$, $WO_3$, $ZrO_2$ and $MnCO_3$ as starting materials and were tested for dielectric constant, Q and $\tau f$ in the temperature range of $-25°$ C. to $+75°$ C., at frequencies of 9.5 to 10.5 GHz.

The proportion of each component and test data are given in Table below and Sample Nos. 27 to 33 are shown for comparison purposes.

TABLE

| Sample No. | Composition (Mole Percent) | | | | | Dielectric Properties at 9.5 to 10.5 GHz | | |
|---|---|---|---|---|---|---|---|---|
| | BaO | TiO₂ | WO₃ | ZrO₂ | MnO | Dielectric Constant | Q | τf ppm/°C. |
| 1 | 17.8 | 80.2 | 2 | — | — | 41 | 5600 | 45 |
| 2 | 17.3 | 77.7 | 5 | — | — | 42 | 5200 | 102 |
| 3 | 18.1 | 81.4 | 0.5 | — | — | 39.3 | 5200 | 11 |
| 4 | 18.1 | 81.4 | 0.5 | — | 0.1 | 39.5 | 6000 | 12 |
| 5 | 18.1 | 81.4 | 0.5 | — | 0.5 | 39.7 | 5000 | 16 |
| 6 | 18.1 | 81.4 | 0.5 | — | 1 | 40 | 5300 | 18 |
| 7 | 18.1 | 81.4 | 0.5 | — | 2 | 38.6 | 5100 | 20 |
| 8 | 18.5 | 81.65 | 0.2 | — | 0.2 | 39.3 | 5800 | 6 |
| 9 | 18.1 | 81.4 | 0.5 | — | 0.2 | 39.7 | 5700 | 15 |
| 10 | 18.1 | 81.4 | 0.5 | — | 0.1 | 39.5 | 6000 | 12 |
| 11 | 18 | 81 | 1 | — | 0.2 | 40.0 | 5600 | 27 |
| 12 | 17.8 | 80.2 | 2 | — | 0.2 | 40.4 | 5600 | 49 |
| 13 | 17.3 | 77.7 | 5 | — | 0.2 | 42.1 | 5300 | 106 |
| 14 | 21.1 | 77.9 | 1 | — | 0.2 | 35.8 | 5700 | 23 |
| 15 | 20.3 | 79.2 | 0.5 | — | 0.2 | 37.3 | 5600 | 21 |
| 16 | 19.9 | 79.6 | 0.5 | — | 0.2 | 37.7 | 5600 | 16 |
| 17 | 19.8 | 79.2 | 1 | — | 0.2 | 37.1 | 5600 | 10 |
| 18 | 19 | 76 | 5 | — | 0.2 | 37.5 | 5400 | 55 |
| 19 | 19.1 | 80.4 | 0.5 | — | 0.2 | 38.4 | 5300 | 8 |
| 20 | 18.8 | 80.7 | 0.5 | — | 0.2 | 38.7 | 5300 | 5 |
| 21 | 18.4 | 81.1 | 0.5 | — | 0.2 | 39.3 | 5400 | 6 |
| 22 | 17.8 | 81.7 | 0.5 | — | 0.2 | 40.2 | 5200 | 23 |
| 23 | 17.5 | 82 | 0.5 | — | 0.2 | 40.3 | 5200 | 31 |
| 24 | 18.1 | 80.4 | 0.5 | 1 | 0.2 | 39.7 | 5700 | 14 |
| 25 | 18.1 | 78.9 | 0.5 | 2.5 | 0.2 | 39.4 | 5500 | 13 |
| 26 | 18.1 | 76.4 | 0.5 | 5 | 0.2 | 38.5 | 5300 | 8 |
| 27 | 18.1 | 71.4 | 0.5 | 10 | 0.2 | 35.4 | 2000 | −15 |
| 28 | 18.1 | 66.4 | 0.5 | 15 | 0.2 | 30.4 | 1500 | 5 |
| 29 | 18.2 | 81.8 | — | — | 0.2 | 37.1 | 2600 | 2 |
| 30 | 16.8 | 75.7 | 7.5 | — | 0.2 | 44.0 | 3000 | unmeasured |
| 31 | 22 | 77 | 1 | — | 0.2 | 33.4 | 400 | 7 |
| 32 | 16.6 | 82.9 | 0.5 | — | 0.2 | 42.1 | 4200 | 56 |
| 33 | 18.1 | 81.4 | 0.5 | — | 4 | 38.7 | 1600 | 11 |

Sample Nos. 1 to 3 are compositions made up of BaO, $TiO_2$ and $WO_3$ and Sample Nos. 4 to 7 further contain MnO in addition to these three ingredients. As readily seen from the test results in the Table, these samples all exhibit small dielectric loss and small $\tau f$ properties and the MnO addition provides dielectric ceramics of finer texture and high density, thereby resulting in a high dielectric constant. Further, it has been found that the MnO addition has an effect in improving Q. However the MnO addition should be limited up to 3 mole percent, since Q is reduced with an increase in the addition amount of MnO and, for example, as will be apparent from Sample No. 33, an excess MnO addition above 3 mole percent results in an excessively reduced Q.

Sample Nos. 8 to 13, 29 and 30 are the composition containing BaO and $TiO_2$ in a molar ratio of $BaO/TiO_2=1/4.5$ in which $WO_3$ in the range of 0 to 7.5 mole percent is contained with MnO in the range of 0.1 to 0.2 mole percent in these samples. With respect to the proportion of $WO_3$, the invention ceramics containing $WO_3$ not exceeding 5 mole percent possess greatly improved Q values of 5300 to 6000, as compared with Q of about 2600 of MnO-free ceramics. However, when the content of $WO_3$ exceed 5 mole percent, $\tau f$ is increased excessively and Q is unfavorably reduced. The drawing illustrates this relationship of molar percentages of $WO_3$ and Q values at 10 GHz.

The compositions of Sample Nos. 14 to 23 and 31 to 32 consist of 16.6 to 22 mole percent BaO, 77 to 82.9 mole percent of $TiO_2$ and 0.5 to 5 mole percent $WO_3$. Particularly, in comparison of the compositions of Sample Nos. 16 and 17 containing $TiO_2$ less than 81.8 mole percent, i.e., 79.2 mole percent and 79.6 mole percent of $TiO_2$, and having a $BaO:TiO_2$ molar ratio of 1:4, it can be known that the composition containing 1.0 mole percent of $WO_3$ has a smaller $\tau f$ value than the composition with 0.5 mole percent of $WO_3$. As shown in such experimental data, in the invention ceramic compositions with a relatively low content of $TiO_2$, $WO_3$ has an effect of reducing $\tau f$ and makes possible the attainment of small $\tau f$ over a wide composition range. In the compositions containing BaO and $TiO_2$ both in amounts outside the ranges of the present invention, for example as in Sample Nos. 31 and 32, it has been found that $\tau f$ becomes too large and Q becomes too small.

The compositions of Sample Nos. 24 to 28 comprise 18.1 mole percent of BaO, 81.4 mole percent of $TiO_2$ and 0.5 mole percent of $WO_3$ in which $TiO_2$ is partially replaced by $ZrO_2$ within the range of 1 to 15 mole percent. In these compositions, 0.2 mole percent of MnO was added. It is apparent that $\tau f$ is decreased with an increase in the replacement by $ZrO_2$ and when the replaced amount by $ZrO_2$ reaches 10 mole percent or greater levels, Q is too small.

As described above, according to the present invention, there can be obtained dielectric ceramic compositions having an advantageous combination of properties, particularly high dielectric constant, small $\tau f$ and large Q, in a usual processing manner without requiring extra special step. $\tau f$ is adjusted by changing the proportion of each component. Although the dielectric ceramic compositions of the present invention are described and illustrated in reference with microwave applications, they also give good utility in temperature-compensating capacitors or other applications because of their good electrical properties in a low frequency region.

What is claimed is:

1. A dielectric ceramic composition which comprises a ternary system composition represented by the formula, $$aBaO \cdot bTiO_2 \cdot cWO_3$$

wherein a, b and c are percent molar fractions and $a+b+c=100$; $17 \leq a \leq 21.5$; $75 \leq b \leq 83$; and $0.1 \leq c \leq 5$.

2. A dielectric ceramic composition which comprises a ternary system composition represented by the formula, $$aBaO \cdot b\left(\frac{100-n}{100} TiO_2 \cdot \frac{n}{100} ZrO_2\right) \cdot cWO_3$$

wherein a, b and c are percent molar fractions and $a+b+c=100$; $17 \leq a \leq 21.5$; $75 \leq b \leq 83$; $0.1 \leq c \leq 5$ and $0 \leq n < 10$.

3. A dielectric ceramic composition as claimed in claim 1, containing up to 3 mole percent of MnO, based on the total molar amount of a, b and c.

4. A dielectric ceramic composition as claimed in claim 2, containing up to 3 mole percent of MnO, based on the total molar amount of a, b and c.

* * * * *